Patented Aug. 23, 1932

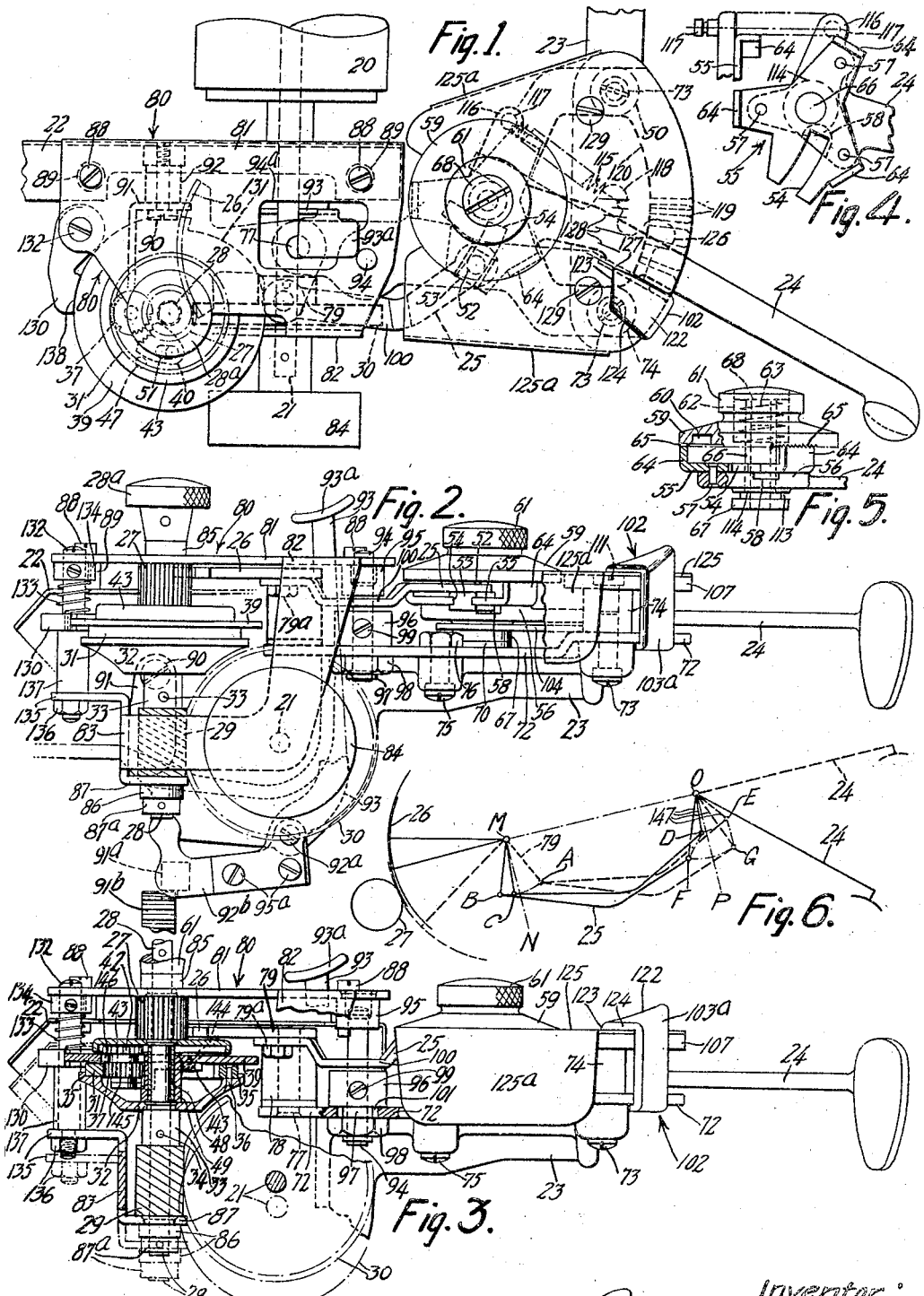

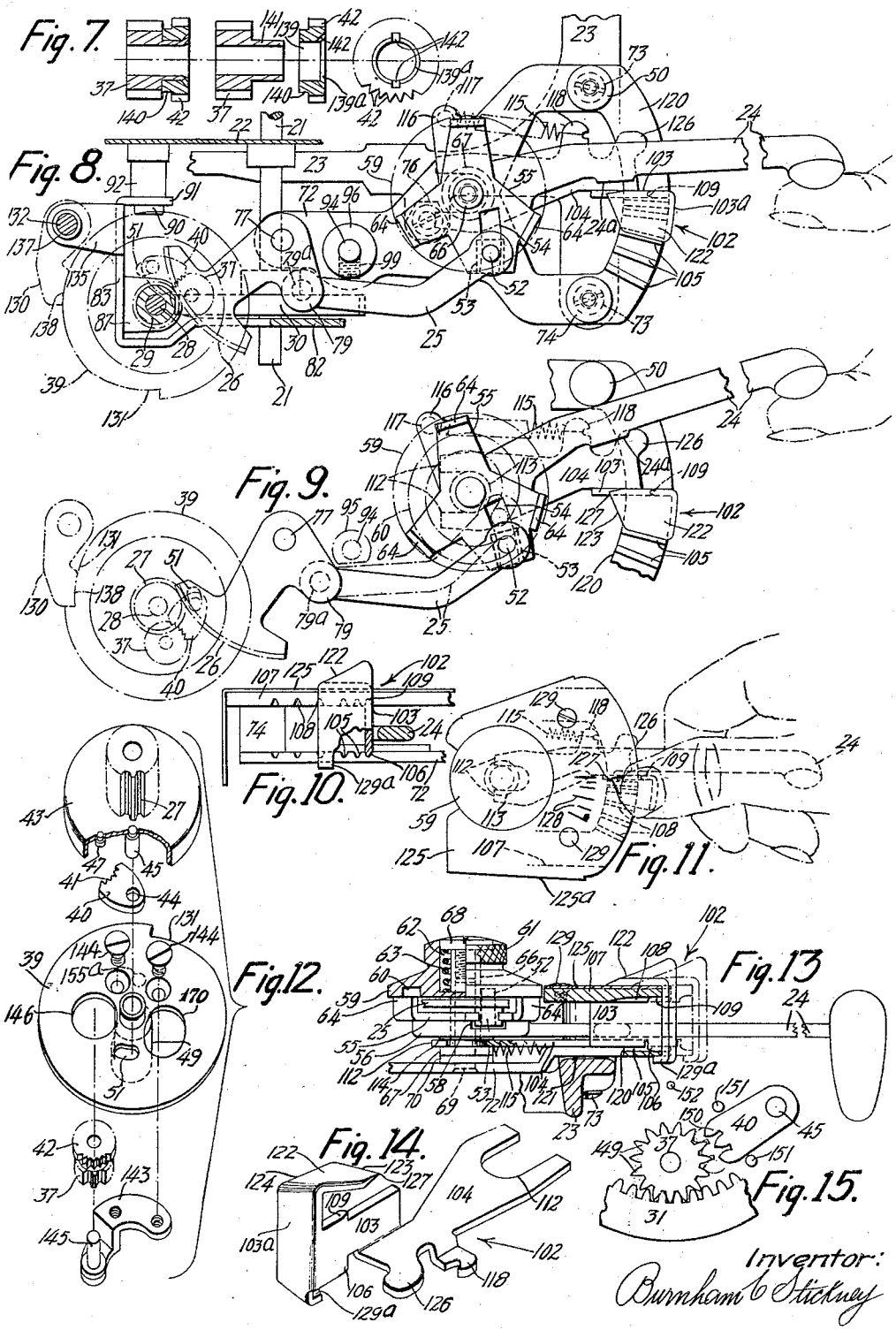

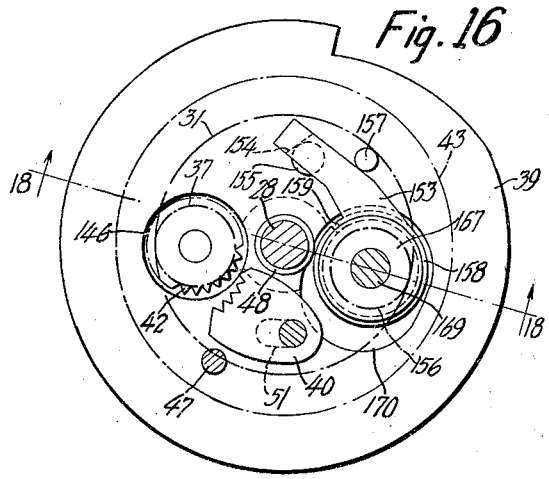
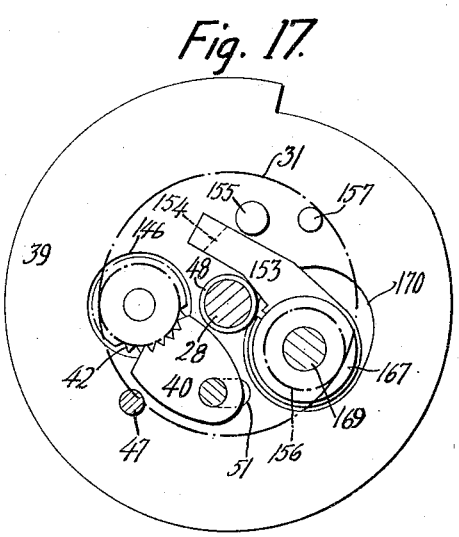
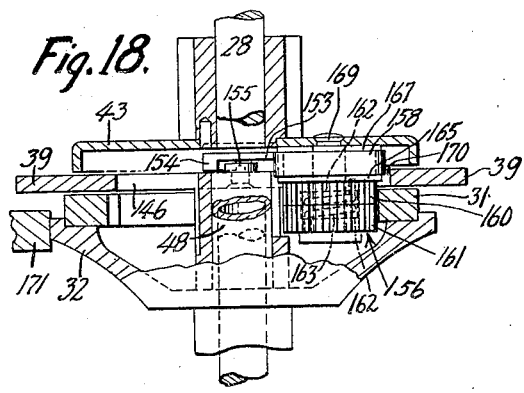
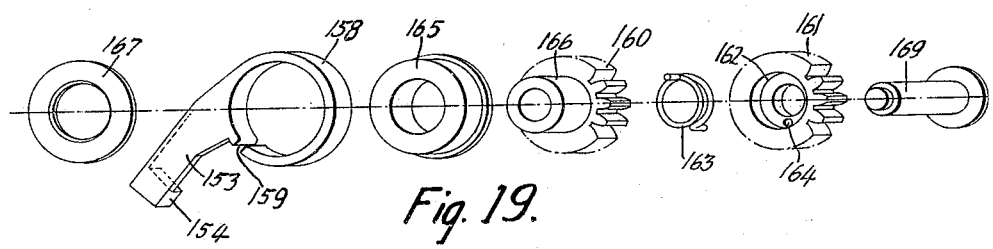

1,873,355

UNITED STATES PATENT OFFICE

BURNHAM C. STICKNEY, OF HILLSIDE, NEW JERSEY, ASSIGNOR TO UNDERWOOD ELLIOTT FISHER COMPANY, OF NEW YORK, N. Y., A CORPORATION OF DELAWARE

TYPEWRITING MACHINE

Application filed September 27, 1926. Serial No. 137,948

The purpose of the present invention is to improve certain features shown in my pending application, Serial No. 41,933, filed July 7, 1925 (now Patent No. 1,683,582, dated September 4, 1928), and in the pending application of Linden A. Thatcher, Serial No. 121,352, filed July 9, 1926 (now Patent No. 1,683,425, dated September 4, 1928).

In the aforesaid application of Thatcher, the clutch-device consists of an internal involute gear concentric with and fastened to a vertical shaft, and a planetary involute pinion in mesh therewith, mounted on a disk which is rotatable on said shaft. The clutch-device also includes a driving member mounted on another disk, which is also rotatable on said shaft and has formed thereon several involute teeth corresponding to the teeth of the planetary pinion and normally disengaged therefrom. A spur-pinion is fastened to the driving member disk, and, by means including a circular rack with which it meshes, is connected to the line-space lever. At the beginning of the forward stroke of said lever the driving member is caused to be driven against the planetary pinion, causing the teeth of said member to interlock with the teeth of the planetary pinion. When said teeth are thus interlocked a further movement of the line-space lever causes the driving member to push the planetary pinion around and thereby causes the aforesaid vertical shaft and platen to rotate.

A feature of the present invention is the provision of a planetary pinion, in mesh with a rack, and driving members having teeth so shaped to avoid sticking or interference between the teeth in interlocking. I make said meshing teeth of standard involute form and have fastened to the planetary pinion a cylindrical collar or disk, around the periphery of which may be formed sharp V-teeth which will coact satisfactorily with corresponding teeth on the driving member. This supplementary set of teeth on the pinion can be of a finer pitch than is possible with standard gear-teeth, and this finer pitch makes possible a nearer approach to absolute uniformity in line-spacing, as will be apparent later.

Another feature of the invention includes a line-spacing mechanism in two assembled units, one of which is fastened to the carriage-frame, the other unit being fastened to the shiftable platen-frame. The complete train of moving parts between the line-space lever and the platen is apportioned between said units in such a way that the point of operating contact between said units is at that part of said train where the aforesaid spur-pinion and circular rack mesh.

The spur-pinion, the axis of which extends in the direction of the case-shift movement of the platen-frame, is made of such length that it is in mesh with the circular rack in both upper and lower case positions of said frame and its attached unit. The teeth of said pinion extend preferably throughout its length, so that in shifting from either of said positions to the other, said teeth are never out of mesh with the circular rack.

The usual guiding means whereby the platen-frame is guided in its case-shifting movement are not rigid enough to prevent undue spreading of the platen-frame unit and the carriage-unit, with a consequent separation of the aforesaid pinion and circular rack, due to said spreading. A further object of the invention, therefore, is to provide improved means whereby the two units are at all times interlocked to prevent said spreading.

It is a further object of the invention to provide improved and simplified means whereby the extent of the line-space lever movement may be variably limited for effecting either said single unit of spacing or one of said multiples thereof. In the present invention the stop that determines the initial position of the line-space lever is made shiftable, and it is a single member made of sheet-metal and having a body-portion extending substantially along and preferably below the lever-arm of the line-space lever.

As shown in the aforesaid pending application of Thatcher, the forward movement of the planetary pinion-disk of the clutch-device ends with said disk always in the same position irrespective of the line-space movement of the platen. This makes possible the application of a stop to prevent overthrow of the disk, and consequently of said platen at the end of a line-spacing movement. An improved stop is provided in the present invention and serves also as a brake upon said disk to retard its reverse movement and thereby facilitate the disengagement of the clutch-device at the beginning of the reverse movement of the line-space lever. Said brake is also applied to stabilize the relative positions of portions of the clutch-device when it is disengaged. The stop, instead of being a part of the circular rack as heretofore, is in the form of a pawl-like member pivoted on a rod supported by the frame of the shiftable platen-frame unit. For making the stop act as a brake it is provided with a surface that preferably bears upon the periphery of the planetary pinion-disk.

Means are also provided to positively prevent overthrow of the planetary pinion-disk at the completion of the reverse movement thereof.

Other features and advantages will hereinafter appear.

In the accompanying drawings,

Figures 1 and 2 are respectively a top plan view and a left side elevation of the improved variable line-spacing mechanism.

Figure 3 is a partly-sectioned side elevation, showing details of the mechanism.

Figures 4 and 5 are respectively a fragmenary top plan view and a fragmentary side elevation of the line-space-lever, showing some details of its construction. Figure 5 shows particularly a modification of said construction. Figure 4 includes a fragmentary end view, showing the arm to which the retracting spring is attached.

Figure 6 is a motion diagram of the line-space-lever movement and the movement of some of the parts actuated thereby.

Figure 7 shows several construction-views of the planetary pinion which is part of the clutch-device.

Figure 8 is an operated plan view of the line-spacing mechanism at the moment the initial movement of the line-space-lever has caused the clutch-device to be engaged.

Figure 9 is an operated view, showing the line-spacing mechanism at the end of the line-space-lever stroke.

Figure 10 shows an elevation of the outer end of the shiftable back stop that determines the swing of the line-space-lever, and also indicates the means for holding said shiftable stop in any of its set positions.

Figure 11 is a top plan view, indicating how the shiftable back stop is withdrawn from a set position, and how it may be moved to any other position.

Figure 12 includes several perspective views, showing details of the clutch-device.

Figure 13 is a partly-sectioned elevation, showing details of the line-space-lever, the shiftable back stop and some related parts.

Figure 14 is a perspective view of the shiftable back stop that determines the throw of the line-space-lever.

Figure 15 is a view indicating one way of shaping the meshing teeth of the planetary pinion, so that a driving-dog may interlock with said teeth without sticking.

Figure 16 is a plan view of the means whereby overthrow of the planetary pinion-disk is prevented at the end of the reverse movement of said disk, and shows said means in position to prevent said overthrow.

Figure 17 is a view similar to Figure 16, but shows the position of the overthrow-preventing means when the planetary pinion and its driving dog are engaged at the beginning of a line-spacing stroke.

Figure 18 is a partial section taken on the line 18—18 of Figure 16, and shows assembled details of the overthrow-preventing means.

Figure 19 includes perspective detail views in assembly order of the parts that constitute the overthrow-preventing means.

The invention is illustrated as applied to the well-known Underwood typewriter, in which a revoluble platen 20 is fastened to a platen-axle 21, journaled in a platen-frame 22 of which a portion of the left side only is shown. Similarly, only a portion of the left side or end of a letter-feeding carriage 23 is shown. The platen-frame is supported and is movable with the platen up and down relatively to the carriage 23 for case-shifting by the usual means, not shown. A line-space-lever 24 is pivotally attached to the carriage 23, and is connected by a link 25 to a circular rack 26 that is also pivotally attached to the carriage 23. Said circular rack 26, by means including a spur-pinion 27, may rotate a vertical shaft 28. The rotation of said shaft is transmitted to the platen by means of a helical pinion 29 keyed to said shaft, said pinion meshing with a helical gear 30 geared to the platen-axle. In order that the pinion 27 and the shaft 28 may rotate independently of one another, as, for example, when the rotation of the pinion 27 is reversed during the return stroke of the line-space-lever, or when the shaft is rotated to rotate the platen for adjustment of a work-sheet on said platen to the printing point, it is provided that the spur-pinion 27 can only rotate said shaft through the medium of a clutch-device similar to that shown in the aforesaid pending application of Thatcher. For facilitating the manipulation of the shaft 28 for said adjustment of the work-sheet, said shaft is provided with a finger-knob 28ª. Said clutch-device, according to the present invention, embodies improved and novel features; and includes essentially an internal gear 31 that is mounted on the shaft 28 and keyed thereto, said gear being mounted for this purpose on a cup-shaped shell 32, which is fastened to a hub-like extension 33 of the helical pinion 29, said pinion being keyed to the shaft 28 by means of a pin 34. It will be seen that the diameter ratio of the helical pinion 29 to its gear 30 is such that the aforementioned adjustment of the work-sheet by rotating the shaft 28 is facilitated, due to the relatively large angular displacement of said shaft as compared to the resulting displacement of the platen. The internal gear is located concentrically with the shaft 28 by means of a recess 35 formed in the cup-shaped shell 32, and fastened to said shell by rivets 36 (Figure 3). Said clutch-device further includes a planetary pinion 37, in mesh with the internal gear 31, and mounted on a disk 39 to roll around said gear 31 in a planetary manner, during which said disk rotates on or with the shaft 28, depending on whether the clutch-device is disengaged or engaged.

It will be seen that gripping and holding the planetary pinion against rotation while it is pushed or possibly pulled around in its planetary path, will cause the internal gear 31 and consequently the shaft 28 and platen 20 to rotate. The means whereby this is accomplished and controlled by the line-space-lever are features of the present invention which provides a driving member or dog 40, having V-shaped teeth 41 that may interlock with similar V-teeth 42 cut around a cylindrical section integral with the planetary pinion 37. Heretofore a driving member was provided having involute teeth that interlocked with similar gear-teeth of the planetary pinion.

The interlocking of the V-teeth of the driving member with a V-toothed section of the planetary pinion prevents rotation of said pinion, and the V-shaped form of the teeth facilitates their engagement and disengagement. Said teeth are normally disengaged as indicated in Figure 1. To enable the driving member 40 to move into interlocking engagement with the planetary pinion to drive said pinion around its planetary path, said member is mounted on a driving disk 43 suitably fastened to the spur-pinion 27. As said disk and spur-pinion are normally disengaged from the shaft 28, they are loosely mounted on said shaft and said driving member 40 may be in the form of a loose flat piece, as shown in Figure 12, with a hole 44, which fits loosely over a pin 45 riveted on the under side of said driving disk 43. On account of the variable line-spacing, the teeth 41 and 42 of the driving member and planetary pinion respectively are not always in direct alignment, and for this reason the driving member may be floatingly mounted to facilitate the interlocking of said teeth. This is best accomplished by permitting a slight rotation of the driving member about its pin 45 between a pin 47 riveted on the under side of the driving disk 43 and a loose sleeve 48 about the shaft 28 which serves to space and separate the driving disk from the adjacent disk 39 on which the planetary pinion is mounted, as may be seen in Figure 1. The loose sleeve 48 fits the central hole of the planetary pinion disk 39, which has a downwardly-extending hub 49 formed thereon to bear upon the bottom of the cup-shaped shell 32. Said hub 49 is of such length that the under surface of the planetary pinion disk 39 clears the upper surface of the internal gear 31.

Any movement of the line-space-lever 24 in either a forward or return direction is transmitted to the spur-pinion 27 which thus receives a reciprocating rotation. At the end of a small initial part of the forward or line-spacing stroke of said lever, the driving member 40 has been shifted to interlock with the planetary pinion 37, as indicated in Figure 8. The completion of the line-spacing stroke effects the line-spacing of the platen in the manner described by causing the planetary pinion while thus locked to be driven by the driving member 40. The end of said stroke is always determined, irrespective of the extent of the line-spacing movement of the platen, by a fixed stop 50 on the carriage 23, see Figure 9, which shows the relation of the parts at the end of said stroke.

In a small initial part of the return stroke of the line-space-lever the rotation of the driving disk 43 is reversed which causes the driving member 40 to be withdrawn from interlock with the planetary pinion. For limiting this withdrawal of the driving member and to cause the planetary pinion 37 to be rotated around the stationary internal gear 31 to its initial position, a slot 51 is made in the disk 39 and is so located that the driving member pin 45, which projects through said slot, picks up the planetary disk 39 after the driving member is withdrawn from the planetary pinion, and the return movement of the line-space-lever causes the planetary pinion to roll idly around the internal gear to its initial position.

The extent of a line-spacing unit of movement of the platen depends upon the distance the fulcrum of the link 25 is from the fulcrum of the line-space-lever, and in order that said distance may be varied, the link 25 may be fulcrumed upon a pin 52, on a block 53 having sides slotted for a close sliding fit in a slot 54, formed in a sheet-metal plate 55 that may be an integral part of the line-space-lever. In the present form of the invention said plate 55 is manufactured separately from the line-space-lever and is fastened to a pad 56 of said lever, by rivets 57, see Figures 4 and 5. It reduces the cost of manufacturing to thus form the slot 54, in which said block 53 slides, in a sheet-metal part, which may be a stamping. The block 53 may be moved to vary the distances of the pin 52 from the fulcrum of the lever, by means of the usual camming member 59 which has the usual spiral camming groove 60, a plan view of which is indicated in Figure 9. Said groove closely fits the free end of the pin 52, above the link. When the cam-member is rotated said pin and the end of the link 25 move toward or away from the fulcrum of the line-space-lever, the pad 56 having a suitable recess 58 formed therein to clear the shiftable block 53. The cam-member may be provided with a knurled periphery 61, and a counterbored recess 62, see Figures 5 and 13, for receiving a helical spring 63 which bears upon the bottom of said recess and forces the cam-member against three circumferentially spaced upturned projections or ears 64 of the sheet-metal plate 55. It will be seen that these projections engage said cam-member 59 near its outer circumference where friction developed by the pressure of the spring 63 is most effective to hold said cam-member against accidental displacement when the swing of the line-space-lever is suddenly arrested by one of its stops. A further safeguard against said displacement may be provided by forming fine teeth 65 around the bottom of said cam-member which co-operate with similar teeth formed of the adjacent edges of the upturned projections 64, see Figure 5. The pitch of said teeth should be as fine as possible, say not over twenty thousandths of an inch, so that a gradual fine variation of the position of the pin 52 may be effected. For mounting the cam-member 59 concentric with the fulcrum of the line-space-lever, said lever may include a sleeve 66 formed with a head 67. The hole in the bottom of the recess 62 fits the sleeve 66, which extends upwardly far enough so that the head of a screw 68, threaded into the end of said sleeve, affords a face against which the upper end of the spring 63 may react, see Figures 5 and 13. The head of said screw fits into the recess 62 and forms a bearing for the upper part of the cam-member.

With this construction, the spring 63 serves to hold the cam-member 59 spring-pressed upon the ears 64, and permits a slight rise and fall of said member when ratcheting over the V-teeth of the ears during a pin-setting movement along the line-space lever 24.

As a fulcrum for the line-space-lever there is provided a stud 69, Figure 13, having a flange 70. The upper face of said flange affords a bearing for the bottom of the head 67 of the sleeve 66, and the lower face bears upon a plate 72, to which the stud is riveted, as shown in Figures 2 and 13. Said stud fits the hole in the sleeve 66 of the line-space-lever and thus provides a fulcrum for said lever.

The plate 72 forms a base for one of the two assembled units of the line-spacing mechanism that is secured to the carriage 23 by means of three screws 73 and 75, two screws 73, at the front of the carriage, threading into the stop 50 and a spacer 74, while the third screw 75 secures the carriage and plate by a clamping nut 76.

The circular rack 26 is fulcrumed upon a stud 77 riveted into the plate 72, and has a hub 78, which gives it a long bearing. Said circular rack has an arm 79 to which the other end of the link 25 is connected by means of a suitable pivot 79ᵃ. The spur-pinion 27, which meshes with said circular rack, is assembled upon a fixture or bracket generally indicated by the numeral 80. Said bracket formed from a sheet-metal blank to provide a top plate 81, a side wall 82 extending downwardly from said top plate, and a rear side 83 bent inwardly toward the platen from said side wall 82. The downwardly-extending side wall 82 has a bearing hole for the platen-axle 21, which is thus supported near its end to resist the strain resulting from the reaction between the helical pinion 29 and the gear 30. The usual platen-knob 84 may be fastened to the platen-axle adjacent to said side 82 as shown in Figure 1.

For retaining the vertical shaft, on which said helical pinion 29 and the clutch-device hereinbefore mentioned are mounted, said bracket 80 includes an upper bearing 85 in the top plate 81, and a lower bearing 86 in a horizontal tab 87 that is bent from the rear side 83 of said bracket. The helical pinion 29 bears upon said tab 87 and the upward thrust, due to the camming action of said helical pinion with its gear, may react between a collar 87ᵃ and the bottom of the bearing 86. For securing said bracket 80 to the platen-frame, two screws 88 pass through holes in the upper plate 81, through spacing collars 89, and enter threaded holes already in the upper face of the left end of said platen-frame. The bracket 80 may be further secured by means of a screw 90 which passes through a tab 91 bent from the side 83 of said frame, and through a hub 92, and is then threaded into the side of the platen-frame, see Figures 1, 2 and 8.

The strain resulting from the operation of the line-space-lever must in some way react upon some portion of the platen-frame 22 and said strain particularly if not properly directed tends to twist or displace said platen-frame from its usual guides and supporting means, not shown. It is for the purpose of reducing this tendency to a minimum that the train of operating parts in the line-spacing mechanism is divided into two units. It is desirable that the devision be made at a point in said train where the reaction between the two units will be least, and this point of least reaction is where the circular rack 26 meshes with the spur-pinion 27. It will be noted that said circular rack is disposed so that this line of reaction is in a direction that is substantially longitudinal of the platen and the platen-frame, and thus has the least tendency to twist or displace said frame from its guides and supporting means.

In order that the platen-frame with its line-spacing unit may move up and down for case-shifting, there must be an up and down movement of said pinion relative to the circular rack 26 with which it meshes, and said pinion is therefore made elongate as shown in Figures 2 and 3. Figure 2 shows the platen-frame and its line-space unit in lower case or normal position, and Figure 3 shows the shifted or upper case position of said platen-frame and unit. The platen-frame unit and carriage-frame unit of the line-spacing mechanism are secured against relative displacement by interlocking means embodied in the bracket 80 and the plate 72 respectively of said units, consisting preferably of a guide post or rod 94 having a sliding fit in a hole formed in a hub 95 fastened to the bracket 80 and provided with a collar 96 having a reduced threaded portion 97, Figure 3, on which is threaded a nut 98 whereby said collar may be secured to the plate 72, and the rod is removably held in said collar by means of a screw 99. It is desirable to remove said rod to facilitate the placing into position or removal of the platen-frame unit, and, to further facilitate said placing and removal, the link 25 has an offset portion 100 which clears the hub 95 when the platen-frame unit is in position. To afford clearance for a relative alignment of the rod 94 and the hole in the hug 95, a hole 101 in the plate 72, through which the reduced threaded portion 97 of the collar 96 passes, is of somewhat larger diameter than said portion as indicated in Figure 3.

It is a feature of the arrangement of the platen-frame unit, supported by the bracket 80, that said unit does not interfere with the employment of the usual carriage release lever 93 for releasing said carriage from its letter-feeding pinion 91$^b$; see Figure 2, by lifting the usual letter-feeding rack 91$^a$ away from said pinion, said lever being pivoted to the carriage at 92$^a$, and provided with a finger-piece 93$^a$ above the top plate 81 of the bracket 80. A hole 94$^a$ (Figure 1) is made in said top plate to clear said lever 93.

As is usual in typewriters the line-spacing mechanism is capable of rotating the platen through a single line-space unit, or certain multiples of said unit. In the present form of the invention multiples which are 1¼, 1½, 2, 2½ and 3 times a single unit are provided for. Said multiples are predetermined by the extent through which the line-space-lever may swing. To vary said extent, the initial position of the line-space-lever is varied, the final position of said lever always being the same, that is, against the stop 50.

For predetermining the initial position, a shiftable stop generally designated by the number 102 is provided and is formed of a single sheet-metal piece. A perspective view of said stop is shown in Figure 14. The portion of said sheet-metal piece against which the line-space-lever stops is an upstanding side 103 bent up from a body portion 104, which, when the line-space-lever is in normal position, underlies said lever. The forward part of said body portion rests upon the plate 72. For setting and holding said upstanding side 103, which may be regarded as the stop proper, said plate 72 has notches 105 in any one of which a lower tab or tooth 106 formed on a lower edge of said upstanding side may be set. To aid in holding said upstanding side in any position, an upper plate 107 is provided, said upper plate also having notches 108 in which an upper tooth 109 formed on the upper edge of said upstanding side may be set. Figure 10 is a front end view showing said notches 105 and 108 and the relation of the stop 102 thereto. Said upper plate 107 is spaced from the plate 72 by the stop 50 and spacer 74, which, as already mentioned, have threaded holes for the screws 73 which clamp the plate 72 to the carriage 23. For fastening said upper plate 107 screws 111 may be threaded in said holes, as shown in Figure 2, the heads of said screws being sunk below the top of said upper plate. It is for the purpose of stabilizing any set position of the stop 102 that its body portion 104 is provided, and said body portion has accordingly a forked end 112, Figure 14, which fits and embraces a circumferential groove 113 formed by the hub 67 of the line-space-lever, as indicated in Figure 5. One side of said groove is formed by a finished circular pad 114 on the under side of said lever.

For drawing the line-space-lever against the upstanding side 103, and also for holding the stop 102 in the notches 105 and 108, there is provided a spring 115, having one end attached to a spring arm 116 by means of a suitable downwardly-extending stud 117 (Figure 4), and the other attached to a tab 118 projecting from the body portion 104 of the stop. Said tab 118 also limits the withdrawal of the stop by striking, as shown in Figure 11, the inner arcuate edge of a rim 120 that is part of the plate 72. Said tab is bent, as shown in Figure 14, so that the spring 115 clears the line-space-lever and the top of a carriage-rail 121, as indicated in Figure 13. In setting the stop 102 for any position it is first withdrawn from the notches 105, 108, as indicated in Figure 11, which shows the thumb of the operator's hand applied to said stop while the other fingers of the hand lightly grasp the line-space-lever. In order that the stop may thus be manipulated, there is provided a finger-piece 122, which is preferably formed integral with said stop, as shown, and overlies the upper plate 107. To support said stop against a tendency to tilt when it is withdrawn from the notches, said finger-piece is formed so that its inner edge 123 and side edge 124 bear upon a cover-plate 125 that is fastened upon said upper plate 107. To further support the stop against a tendency to tilt the body portion, the stop has a projection 126 which forms an extended bearing upon the plate 72. From its edges 123 and 124 said finger-piece flares upwardly toward the outer right-hand corner thereof, to form a somewhat concave surface which facilitates the gripping of said finger-piece by the thumb or finger of the operator. The finger-piece may be further provided with a pointer 127 which may co-operate with a suitable scale 128 applied to the top cover 125 to indicate for which multiple of the line-spacing unit the stop 102 is set. Figure 1 shows the stop set for triple spacing. Figures 8 and 9 show the stop set for a single or unit space.

The cover 125 substantially covers an exposed portion of the line-spacing mechanism, and may have sides 125$^a$ extended downwardly to suit. Said cover is fastened to the upper plate 107 by screws 129 threaded into said plate, Figure 13. When the stop 102 has been withdrawn from its holding notches, as shown in Figure 11, it may be moved to a position opposite the notches corresponding to any desired one of the established multiples of a line-space unit, all positions being indicated by the aforesaid scale 128. While the stop is thus moved it is held clear of said notches. When the stop is opposite the desired notches it is caused to enter said notches by a releasing movement of the thumb or finger which has held it. The entry of the upper and lower tabs 106 and 109 of the stop into the notches may be facilitated by chamfering the entering ends of said tabs, as indicated. Said entry may be further facilitated by chamfering the outer edges of the notches, as indicated at 119 in Figure 1. On account of the close proximity of some of the notches one to the other, the notches are preferably formed as indicated in Figure 10, which shows V-shaped notches with rounded bottoms, thus materially strengthening the dividing walls between the notches. As the stop 102 is withdrawn from or enters said notches, it is intended that it shall move along the finger-arm of the line-space-lever. Said finger-arm may be provided with a finished pad 24$^a$ Figure 8 which bears upon the upturned side 103 of said stop. For forming the finger-piece 122 there is bent from said upturned side 103, as will have been noted, a portion 103$^a$. From the bottom of said portion 103$^a$ there may be bent a tab 129$^a$, which may support the rim 120 that is part of the plate 72.

As will be apparent in Figure 9, the disk 39 on which the planetary pinion 37 is mounted has a rotary movement equal to the rotary movement of the disk 43, after the engagement or disengagement of the driving member 40 and the supplementary teeth 42 of said planetary pinion 37 has been effected. The disk 39 is rotated to a permanent stop position at the end of every line-spacing operation irrespective of the extent to which the platen is line-spaced. This condition is provided for in order that a pawl-like stop 130 may co-act with a notch 131 in said disk to prevent overthrow of said disk 39, and consequently of the platen at the end of a line-spacing operation. To meet this condition it is necessary that the shiftable pin 52, to which one end of the link 25 is connected, describe an arc about the pivot 79$^a$ which is at the other end of said link as said pin 52 is moved toward or away from the line-space-lever fulcrum, when the parts are in the position shown in Figure 9.

The initial position of the disk 39 and its notch 131 will vary from that shown in Figure 1 to a position in which the notch 131 has been rotated somewhat more toward the stop 130 than is shown in Figure 8, the further rotation of said disk toward said stop being caused by moving the pin 52 toward its position of minimum distance from the fulcrum of the line-space-lever, in which case any given swing of the line-space-lever causes a corresponding platen rotation of minimum extent. The parts of the mechanism are arranged and proportioned, as shown, for producing a variation in the line-space unit ranging from $\frac{1}{10}$ of an inch to $\frac{1}{6}$ of an inch.

The stop 130 also functions as a brake on said disk 39 to facilitate the withdrawal of the driving member 40 from the supplementary teeth 42 of the planetary pinion. The braking effect of said stop upon the disk 39 tends to hold said disk until it is picked up for a reverse rotation by the pin 45, said reverse rotation commencing as soon as said pin, as already explained, engages the end of the slot 51 in said disk. For mounting said stop 130 and for providing and adjusting its braking pressure upon the disk 39, there is provided a rod 132, around which is wound a torsion spring 133, one end of which is fixed to a collar 134 fastened on said rod, the other end of said spring being attached to said stop, as shown in Figures 2 and 3. The rod 132 is mounted in the bracket 80 between the top plate 81 of said bracket and a tab 135 bent from the side 83 of said bracket. The lower end of said rod, reduced to form a shoulder, passes through a hole in said tab 135, and is threaded for a clamp-nut 136 to draw said shoulder against said tab, and thereby hold the rod.

The torsion of the spring 133 may be adjusted by turning the rod when said clamp-nut 136 is loosened. The stop 130 is loosely mounted on said rod and is located in a position adjacent the periphery of the disk 39 by means of a sleeve 137. A braking surface 138 on said stop conforms to said periphery of said disk, and an arcuate edge of the notch 131 in said disk conforms to said surface. It will be understood that the spring 115 which retracts the line-space-lever must be strong enough to overcome the braking effect of the stop 130.

The planetary pinion 37 with its supplementary teeth 42 may be constructed as indicated in Figure 7, which shows at the left a view of said pinion 37 assembled with a separately made collar 140 on which said supplementary teeth 42 are formed. The view on the right of said Figure 7 shows an end view of said collar, and the two intermediate views show the pinion and collar separated. The separate pinion has a reduced portion 141 which fits a corresponding hole 139 in said collar. The outer edge of said hole has a bevel 139ª against which the end of the wall formed by the reduced portion 141 may be expanded to fasten the collar to the pinion.

It will be noted that the collar 140 on which the teeth 42 are formed is of somewhat larger diameter than the planetary pinion. It is desirable to make said diameter as large as possible to the end that the pinion 37 may be positively held when the driving member teeth interlock with the teeth 42 of said pinion. One or more notches 142 may be formed in the bevel 139ª of the collar, and into these notches the extended end of the wall may be staked to prevent relative rotation between the pinion and its collar. As already stated, the teeth 41 of the driving member 40 and the teeth 42 of the pinion are not always in direct alignment at the beginning of a line-spacing stroke on account of the variable features of the mechanism. This shifting of the relative initial positions of said driving member and pinion theoretically impairs the uniformity of the line-spacing. Practically, however, this impairment of uniformity will not be noticeable, particularly if the pitch of said teeth is made as fine as possible. In the drawings herein shown, said pitch is exaggerated for the sake of clearness. The limit of such fine pitch is reached in a smooth surface, in which case the periphery of the collar 140 and the coacting surface of the driving member become elements of a friction-clutch which require only a minute separation to effect their disengagement. For this reason the pitch of said teeth 41 and 42 should be no greater than is required to afford a sufficient degree of positiveness of the gripping effect between said teeth.

For mounting the planetary pinion 37 on its disk 39, there is provided a bracket 143, see Figures 3 and 12, secured to said disk by screws 144 and having a stud 145 fixed therein upon which the planetary pinion rotates. Said bracket and stud are so proportioned and disposed that the pinion 37 meshes with the internal gear 31 below the disk 39, see Figure 3. The driving member 40 being preferably above said disk the upper part of the planetary pinion upon which are formed the supplementary teeth 42 protrudes through a hole 146 in said disk 39, so that said supplementary teeth are above said disk and thus in position to be engaged by the teeth of the driving member 40. It will be noted that the hub 49 formed on said disk 39 separates the underside of said disk from the internal gear 31, and that the loose sleeve 48 between said hub and the shaft 28 tends to reduce the friction between said hub and said shaft.

A feature of the present invention is an improved disposition of the fixed length arm 79 of the circular rack 26 and the variable length arm of the line-space-lever in relation to the centers of said circular rack and line-space-lever. The length of the variable arm of the line-space-lever is defined, as explained, by the position of the pin 52 to which one end of the link 25 is connected. The condition governing said disposition of said arms and their resulting movement is that there shall be as nearly as possible a uniform ratio of any proportional part of the established maximum swing of the line-space-lever to the resulting proportional part of the maximum rotation of the platen, irrespective of the length of the variable arm which determines the extent of said maximum platen rotation. For example, if the shiftable stop 102 is set for a single line-space, and the position of the pin 52 is adjusted for a certain desired extent of said single line-space, it is required that as nearly as possible the exact multiples of said single line-space, for which the other positions of the shiftable stop have been established, may be effected when said stop is set to said other positions.

In describing the disposition of the aforesaid arms reference may be had to Figure 6, which is what may be called a motion diagram in which the lines 147 indicate the minimum and maximum lengths of the variable arm of the line-space-lever, and the extreme positions of said arm corresponding to said lengths. The fixed arm 79 of the circular rack describes an arc varying in maximum extent depending upon the length of the variable arm of the line-space-lever. When said length is a minimum said arm 79 describes an arc from C to A, and when said length is a maximum the arc described is from B to A. When the pin 52 is positioned for said minimum length, said pin describes, in a full swing of the line-space-lever, an arc DE, and when said pin is positioned for said maximum length it describes an arc FG. The connecting link between the fixed arm 79 and the variable arm 147 is represented in different operated positions by lines numbered 25, which is also the reference number of said connecting link.

It will be noted that for any transition along the arc DE or GF to result in a corresponding and proportional transition along the arc CA or BA, said arcs DE and GF must be equal in curvature to the corresponding arcs CA and BA and the straight lines joining the similar ends of corresponding arcs should be parallel or coincide. On account of the varying position of the pin 52 it is obviously impossible to obtain this condition. A sufficiently close approximation, however, which will answer practical requirements is, for the herein-shown disposition of the parts of the mechanism, as follows. The arms 79 and 147 are so disposed that they describe respectively the maximum arcs BA and FG in such a way that said arcs are bisected respectively by lines MN and OP, which are perpendicular to the line MO that joins the fulcrum of said arms. A further condition conducing to the result desired is, that the length of the fixed arm 79 shall be or shall approximate a mean between the minimum and maximum lengths of the variable arm 147. It will be noted that the improved disposition of the aforesaid arms is obtained in part by taking advantage of the fact that the line represented by DF or EG along which the pin 52 is shifted may deviate substantially from a line through the fulcrum indicated by O, without substantially impairing the positiveness with which the cam-groove 60 holds the sliding block 53, as will be apparent from an inspection of Figure 9.

As previously mentioned there may be provided, in order to prevent sticking together of the teeth of the planetary pinion and driving member, a planetary pinion, as indicated in Figure 15, having meshing teeth 149 shaped to prevent said sticking, in which case correspondingly-shaped teeth 150 of the driving member 40 would grip said pinion at and by its meshing teeth 149. In the herein-shown arrangement of the mechanism said meshing teeth would be extended upward into the space occupied by the aforesaid supplementary teeth 42, and thus replace said teeth 42. It may be mentioned here that a middle tooth or space of the driving member, if mounted as shown, should lie on the line which joins the center of the pin 45 and the center of the planetary pinion when said pinion is gripped by the driving member, and that this condition should obtain whether the driving member be of the form shown in Figure 15, or of the form shown in the other figures. Figure 15 also indicates the driving member 40, mounted on the pin 45 and capable of a floating movement which is limited by pins 151 that may be riveted into the driving disk, said disk being omitted from said Figure 15. The center of rotation of said disk is the point indicated by the small circle 152 in Figure 15.

For preventing overthrow of the planetary pinion-disk 39 at the end of the reverse movement thereof, and thereby preventing the teeth 42 of the planetary pinion from becoming engaged again with the teeth of the driving member 40, there may be provided an interponent which will prevent a relative movement between said planetary pinion-disk 39 and the disk 43 on which the driving member is mounted, as shown in Figure 16. Said interponent may be in the form of an arm 153, swingably mounted on the driving disk 43, and may have a downwardly-directed projection 154, which, when the arm is in normal position, abuts a pin 155, or its equivalent, on the upper surface of the planetary pinion-disk 39. It will be seen in Figure 16, which shows the arm 153 in normal position, that said arm in said position is effective to prevent re-engagement of the teeth 42 and the driving member 40. The driving disk 43 is indicated by the broken line 43 in said Figure 16, and it will be remembered that said driving member disk is positively connected to the line-space lever, shown in the other figures. At the beginning of the forward movement of the line-space lever, the driving member 40 must move toward the planetary pinion-teeth 42, and the arm 153 must simultaneously be moved to permit the necessary relative rotation of the driving disk 43 and the planetary pinion-disk 39. To effect this movement of the arm 153, there is provided a second planetary pinion generally indicated by the number 156, and said arm is frictionally held on said pinion 156, so that as soon as said pinion 156, mounted on the driving disk, is caused to roll around the internal gear 31 with which it meshes, there is a corresponding rotation of the arm 153, causing it to withdraw from the pin 155 and assume a position as indicated in Figure 17. While the projection 154 of the arm 153 has moved from the pin 155, the driving member 40 and the teeth 42 of the planetary pinion have become engaged. In Figures 16 and 17 the internal gear 31, the planetary pinion 37 and the planetary pinion 156 are represented by their respective pitch circles. After the engagement of the driving member 40 and the planetary pinion-teeth 42 have been effected, a further revolution of said pinion and driving member causes the platen to be line-spaced in the manner already described. At the beginning of the reverse movement of the line-space lever, the member 40, as already explained, recedes from the teeth 42, and during this recession the pinion 156 is caused to roll in a reverse movement around the stationary internal gear 31, and thereby causes the arm 153 with its projection 154 to assume its normal position again, of Figure 16. As the pinion 156 continues to rotate and roll around the internal gear 31 throughout the remainder of the reverse movement of the driving disk 43 on which said pinion 156 is mounted, the arm 153 is prevented from rotating with said pinion 156 by a suitable stop 157, which may project from and be fastened to the planetary pinion-disk 39. It is to enable the pinion 156 to roll idly around the gear 31 in said reverse movement, while the arm 153 is thus held by the stop 157, that said arm 153 is frictionally held by the pinion 156. Details of the means whereby the arm 153 is thus held by the pinion 156 are best shown in Figure 19, where the arm 153 has a resilient ring-like hub 158, which is split at 159, or elsewhere therearound. The planetary pinion 156 is a composite pinion made of an upper portion 160 and a lower portion 161, each portion having a recess 162. The purpose of making the pinion 156 in two portions is to provide for taking up any back-lash there may be between said pinion and the internal gear 31 with which it meshes, as by means of a torsion spring 163 that is confined within the space formed by the recesses 162. One end of said spring is received by a hole 164 (Figure 19) in the lower portion 161, and the other end of said spring is received by a similar hole, not shown in said Figure 19, in the upper portion 160. It will be seen that said spring 163 causes a relative rotation of said portions 160 and 161 to an extent which will take up said back-lash between the composite pinion 156 and the internal gear 31. It is necessary that this backlash be taken up in this manner or otherwise, so that the arm 153 will be forced to move as soon as the driving disk 43 begins its forward rotation, and thereby cause immediate recession of the arm 153 from the pin 155. For mounting the arm 153 upon the pinion 156, there may be provided a collar 165, around which the ring-like hub 158 is sprung. The collar 165 is pressed upon a reduced portion 166 formed upon the upper portion 160 of the pinion 156. Said reduced portion extends sufficiently beyond the upper surface of the arm 153 to receive a washer 167, which, when the end of said reduced portion is riveted into a countersunk hole, said washer retains the arm 153. The composite pinion 156, with its arm 153 frictionally held thereby, as shown, is mounted upon the driving disk 43 by means of a stud 169. The movement of the arm 153 away from the pin 155 may be limited by the sleeve 48, against which the side of said arm may stop, as shown in Figure 17. In Figure 18, the upper portion of said sleeve is shown broken away and the stop 157 is omitted from said Figure 18 for the sake of clearness. As the composite pinion 156 with its arm 153 must project from the driving disk 43 through the planetary pinion-disk 39, there is formed in said planetary disk a suitable opening 170. Said opening 170 is elongated, as shown in Figures 16 and 17, on account of the small relative rotation between the driving disk 43 and the planetary pinion-disk 39 necessary to effect the engagement or disengagement of the driving disk 43 and the planetary pinion-teeth 42. On account of the friction between the arm 153 and the pinion 156, on which said arm is mounted, there may be a tendency for the internal gear 31 to be rotated reversely during the reverse movement of the driving disk 43. To overcome this tendency, there may be applied to the periphery of the shell 32, to which the internal gear 31 is fastened, braking means 171, as indicated in Figure 18. Said braking means may be similar to the braking means embodied in the stop 130 and may be similarly supported, in which case the sleeve 137 may be replaced by or have wound around it a suitable spring, not shown, for said braking means 171. The pin 155 may be located on the planetary pinion-disk 39 between the screws 144, as indicated by the dotted circle 155ª in the planetary pinion-disk view at Figure 12.

It will be understood that such rearrangement is within the scope of the present invention; that the portion of the invention relating to the arm 153 and its associated parts resides mainly in taking advantage of the fact that the end of said arm, or similar feature, attached to said pinion, describes a sort of hypo-cycloidal movement as said pinion is rolled around the internal gear; and that said hypo-cycloidal movement is effective to cause said end of said arm to be withdrawn from the pin 155 without impeding the relative movement of the disks 39 and 43 which, at the same time, takes place as the driving member 40 moves to engage the planetary pinion-teeth 42.

Variations may be resorted to within the scope of the invention, and portions of the improvements may be used without others.

Having thus described my invention, I claim:

1. In a typewriting machine, the combination with a revoluble platen, of line-spacing means including a line-space lever, a gear in train with said platen, a rotary pinion in mesh with said gear having a V-toothed section rotatable therewith, and means controlled by said lever and co-operative with said V-toothed section whereby said pinion may be locked to rotate the gear and effect a line-spacing rotation of said platen.

2. In a typewriting machine, the combination with a revoluble platen, of line-spacing means including a line-space lever, an internal gear in train with said platen, a planetary pinion in mesh within said gear and having separate pinion-detenting teeth rotatable therewith, and means controlled by said lever operative to engage said detenting teeth to lock the pinion and drive the gear to effect a line-spacing rotation of said gear and platen.

3. In a typewriting machine, the combination with a revoluble platen, of line-spacing means including a line-space lever, an internal gear in train with said platen, a rotatable planetary pinion in mesh within said gear, said pinion having a V-toothed section supplementary to its gear-toothed section, and a V-toothed dog movable by said lever in line-spacing operation by interlocking with said V-toothed section of the pinion, whereby said pinion becomes relatively fixed and operative to drive the gear and effect a line-spacing rotation of said gear and platen.

4. In a typewriting machine, the combination with a revoluble platen, of line-spacing means including a line-space lever, an internal gear in train with said platen, a rotary planetary pinion in mesh within said gear, said pinion having a toothed pinion-detenting section supplementary to its gear-toothed section, the teeth of said pinion-detenting section having a V-shape substantially finer than the pitch of the gear-teeth, and V-toothed means movable by said lever to interlock with said pinion-detenting toothed section, whereby said pinion may be locked and become a driving element for the gear to effect a line-spacing rotation of said gear and platen.

5. In a typewriting machine, the combination with a revoluble platen, of line-spacing means including a line-space lever, a gear in train with said platen, a pinion having teeth always in mesh with said gear and other teeth never in mesh with said gear, and means including a driving member having teeth capable of interlocking with said last-named pinion-teeth and having a substantially large pressure angle to render them self-releasing to permit the interlockable teeth to be disengaged without sticking, while said gear is stationary, at the beginning of the return stroke of the line-space lever.

6. In a typewriting machine, the combination with a revoluble platen, of line-spacing means including a line-space lever, a gear in train with said platen, a pinion having teeth always in mesh with said gear and other teeth not engageable with said gear, and means including a driving member having teeth interlockable with said last-named pinion-teeth, said interlockable teeth upon the driving member and said other teeth all having a non-wedging contour to render them self-clearing at the return stroke of the driving member while said gear remains stationary to permit the disengagement of said driving member without liability of sticking.

7. In a typewriting machine, the combination with a revoluble platen and a platen-frame, of line-spacing means including a line-space lever, a gear always in train with said platen, a planetary pinion always in mesh with said gear, said gear and said pinion being mounted in a frame attached to said platen-frame, means controlled by said lever, whereby said pinion may be gripped and moved around to effect a line-spacing rotation of said gear and platen, a stop mounted on said gear and pinion frame, and means rotatable by the line-space lever and co-operative with said stop to limit the planetary movement of said pinion and thereby prevent the overthrow of said platen.

8. In a typewriting machine, the combination with a revoluble platen and a platen-frame, of line-spacing means including a line-space lever, a gear always in train with said platen, a planetary pinion always in mesh with said gear, said gear and said pinion being mounted in a frame attached to said platen-frame, means controlled by said lever, whereby said pinion may be gripped and moved around to effect a line-spacing rotation of said gear and platen, a stop mounted in the frame that is attached to the platen-frame, and means rotatable with said gear and pinion and co-operating with said stop to limit the planetary movement of said pinion and thereby prevent overthrow of said platen at the end of a line-spacing stroke of said lever.

9. In a typewriting machine, the combination with a revoluble platen, of line-spacing means including a line-space lever, a gear always in train with said platen, a planetary pinion always in mesh with said gear, means controlled by said lever, whereby said pinion is caused to rotate about the axis of the gear to effect a line-spacing rotation of said gear and said platen, and a stop co-operative with the gear and pinion rotating means to limit the planetary movement for said pinion and gear to prevent overthrow of said platen.

10. In a typewriting machine, the combination with a revoluble platen and a platen-frame, of line-spacing means including a line-spacing handle, a gear in train with said platen, a planetary pinion in mesh with said gear, a rotatable member on which said pinion is mounted to enable its planetary movement, a driving member actuable by said line-spacing handle to grip said pinion and revolve it with said rotatable member to effect a line-spacing rotation of said gear and platen, and braking means whereby said rotatable member is substantially held to facilitate and stabilize the disengagement of said driving member and pinion, said braking means including a rotatable rod, a brake-shoe loose on said rod, a torsion spring having one end attached to said rod and the other end to said brake-shoe, and means to hold said rod when the torsion of said spring has been adjusted by rotating said rod.

11. In a typewriting machine, the combination with a revoluble platen and a platen-frame, of line-spacing means including a line-space-lever, a gear in train with said platen, a planetary pinion in mesh with said gear, a rotatable member on which said pinion is mounted to enable its planetary movement, a driving member actuable by said line-space-lever to grip said pinion and revolve it with said rotatable member to effect a line-spacing rotation of said gear and platen, and braking means whereby said rotatable member is substantially held to facilitate and stabilize the disengagement of said driving member and pinion, said braking means including a brake-shoe co-operative with a notch in said rotatable member to limit the rotation thereof and thereby prevent overthrow of said gear and platen.

12. In a typewriting machine having a revoluble platen, the combination with a platen-frame and a carriage supporting said platen-frame for case-shifting, of a train of line-spacing mechanism, a fixture fastened to said carriage, a fixture fastened to said platen-frame, a driven portion of said train being supported by the platen-frame-fixture, a driving portion being supported by the carriage-fixture, and tending to spring the platen-frame, and means in the form of a guide-post connecting said fixtures whereby said fixtures slidingly interengage in a manner to permit case-shifting and to prevent a relative spreading apart of said gear-portions due to the strain of line-spacing the platen at any shift-position.

13. In a typewriting machine having a revoluble platen, the combination with a platen-frame and a carriage supporting said platen-frame for case-shifting, of a train of line-spacing mechanism, a fixture fastened to said carriage, a fixture fastened to said platen-frame, a driven portion of said train being supported by the platen-frame-fixture, a driving portion being supported by the carriage-fixture and tending to spring the platen-frame, and means on one of said fixtures for interlocking with corresponding means on the other fixture in a manner to permit case-shifting and to substantially prevent a relative displacement of said fixtures, due to the reaction between said portions of said train, one of said interlocking means being adjustable relatively to the other interlocking means for alignment of said means.

14. In a typewriting machine having a revoluble platen, the combination with a platen-frame and a carriage supporting said platen-frame for case-shifting, of a train of line-spacing mechanism, a fixture fastened to said carriage, a fixture fastened to said platen-frame, a driven portion of said train being supported by the platen-frame-fixture, a driving portion being supported by the carriage-fixture and tending to spring the platen-frame and a rod on one of said fixtures slidably co-operating with a hole in the other fixture in a manner to permit case-shifting and to substantially prevent relative displacement of said fixtures due to the reaction between said portions of said train.

15. In a typewriting machine having a revoluble platen, the combination with a platen-frame and a carriage supporting said platen-frame for case-shifting, of a train of line-spacing mechanism, a fixture fastened to said carriage, a fixture fastened to said platen-frame, a driven portion of said train being supported by the platen-frame-fixture, a driving portion being supported by the carriage-fixture and tending to spring the platen-frame, a rod, and means on one of said fixtures for removably holding said rod for sliding co-operation with a hole in the other fixture in a manner to permit case-shifting and to substantially prevent relative displacement of said fixtures, due to the reaction between said portions of said frame, said rod-holding means being adjustable laterally for aligning said rod and said hole.

16. In a typewriting machine, the combination with a revoluble platen, of line-spacing means including a line-spacing handle, a gear in train with said platen, a planetary pinion in mesh with said gear, a driving member controlled by said handle and whereby said pinion may be gripped and moved around to effect a line-space rotation of said gear and platen, said pinion and member being normally disengaged and separated, and means including a movable interponent normally in position to keep said pinion and member separated, and also including means controlled by said handle, whereby said interponent is automatically caused to be moved and rendered ineffective or effective depending on whether said pinion and member are to be engaged or disengaged.

17. In a typewriting machine, the combination with a revoluble platen, of line-spacing means including a line-space lever, a gear in train with said platen, a planetary pinion in mesh with said gear, a driving member controlled by said lever, whereby said pinion may be gripped and moved around the axis of the gear to effect a line-space rotation of said gear and platen, said pinion and member being normally disengaged, and interlocking means including a movable interponent normally in position to hold said pinion and member separated, and controlled by the movement of said lever, whereby said interponent is automatically forced to become ineffective or effective as an interlock, depending on whether said pinion and member are to be engaged or disengaged for a line-spacing control of the platen.

18. In a typewriting machine, the combination with a revoluble platen, of line-spacing means including a gear in train with said platen, a planetary pinion in mesh with said gear, a driving member movable in the planetary path of said pinion and whereby said pinion may be gripped and pushed around to effect a line-spacing rotation of said gear and platen, said pinion and member being normally disengaged and separated, a second planetary pinion in mesh with said gear or its equivalent and constrained to move with said driving member, and an interponent yieldably held by said second planetary pinion to rotate therewith, said interponent being normally in position to keep said first-mentioned planetary pinion and member separated, said second planetary pinion being caused to roll around said gear or its equivalent and thereby move said interponent to permit the engagement of the first planetary pinion and driving member during the forward movement of said driving member, and then caused to roll around said gear or its equivalent in the reverse direction to move said interponent back to its normal position as said first planetary pinion and driving member are disengaged, and thereby enable said interponent to positively keep said first planetary pinion and driving member separated at the end of their reverse movements.

19. In a typewriting machine, the combination with a revoluble platen, of line-spacing means including a gear in train with said platen, a planetary pinion in mesh with said gear, a driving member whereby said pinion may be gripped and pushed around in a forward movement to effect line-spacing of said platen, said driving member and pinion being normally disengaged and separated, and automatically-actuated means whereby said driving member and pinion are kept separated at the end of their reverse movements, said last-mentioned means including a composite second planetary pinion in mesh with said gear or its equivalent, said composite pinion consisting of two adjacent pinions and a spring whereby said two adjacent pinions are rotated relatively to one another to take up the back-lash between said composite pinion and said gear or its equivalent.

20. In a typewriting machine having a revoluble platen, line-spacing means including a line-spacing handle normally disconnected from the platen, a gear connected by movement-reducing gearing with said platen, a planetary pinion in mesh with said gear, a rotatable member on which said pinion is mounted to enable its planetary movement, a normally disengaged driving member actuable through a movement-multiplying train by said line-spacing handle to grip said pinion and revolve it with said rotatable member to effect a line-spacing rotation of said gear and platen, a returning spring for said driving member, braking means whereby said rotatable member is held substantially stationary to facilitate the disengagement of said driving member and pinion for their return independently of said gear, said braking means including a rotatable rod, a brake-shoe loose on said rod, a torsion spring having one end attached to said rod and the other end to said brake-shoe, means to hold said rod when the torsion of said spring has been adjusted by rotating said rod, and adjustable means for effecting minute variations in the return stroke of said driving member.

21. In a typewriting machine having a revoluble platen and a platen-frame, line-spacing means including a line-space lever normally disconnected from the platen, a gear connected by movement-reducing gearing with said platen, a planetary pinion in mesh with said gear, a rotatable member on which said pinion is mounted to enable its planetary movement, a normally disengaged driving member actuable through a movement multiplying train by said line-space lever to grip said pinion and revolve it with said rotatable member to effect a line-spacing rotation of said gear and platen, a returning spring for said driving member, braking means whereby said rotatable member is held substantially stationary to facilitate the disengagement of said driving member and pinion for their return independently of said gear, said braking means including a brake-shoe co-operative with a notch in said rotatable member to limit the rotation thereof and thereby prevent overthrow of said gear and platen, and adjustable means for effecting minute variations in the return stroke of said driving member.

22. In a typewriting machine having a revoluble platen, line-spacing means normally disconnected from the platen and including a line-spacing handle, a gear, movement-reducing gearing connecting said gear with said platen, a planetary pinion in mesh with said gear, a driving member controlled through movement-multiplying mechanism by said handle and whereby said pinion may be gripped and moved around to effect a rotation of said gear to line-space the platen, said pinion and driving member being normally disengaged and separated, means including a movable interponent normally in position to keep said pinion and member separated, and also including means controlled by said handle, whereby said interponent is automatically caused to be rendered ineffective on the platen-driving stroke of the handle, and effective upon the return of the handle, to permit rotation of the platen independently of said line-spacing means, and adjustable means for minutely varying the extent of the effective stroke of said driving member.

23. In a typewriting machine having a revoluble platen, line-spacing means including a gear connected by movement-reducing mechanism with said platen, a planetary pinion in mesh with said gear, a line-spacing handle, a driving member connected by a movement-multiplying train to said handle and movable in the planetary path of said pinion and whereby said pinion may be gripped and pushed around to effect a line-spacing rotation of said gear and platen, said pinion and member being normally disengaged and separated, a second planetary pinion in mesh with said gear or its equivalent and constrained to move with said driving member, an interponent yieldably held by said second planetary pinion to rotate therewith, said interponent being normally in position to keep said first-mentioned planetary pinion and member separated, said second planetary pinion being caused to roll around said gear or its equivalent and thereby move said interponent to permit the engagement of the first planetary pinion and driving member during the forward movement of said driving member, and then caused to roll around said gear or its equivalent in the reverse direction to move said interponent back to its normal position as said first planetary pinion and driving member are disengaged, and thereby enable said interponent to positively keep said first planetary pinion and driving member separated at the end of their reverse movements, rendering the platen normally rotatable independently of said driving member, and adjustable means for minutely varying the extent of the effective stroke of said driving member.

24. In a typewriting machine having a revoluble platen, line-spacing means including a gear connected by movement-reducing mechanism with said platen, a planetary pinion in mesh with said gear, a line-spacing handle, a driving member connected by a movement-multiplying train to said handle and whereby said pinion may be gripped and pushed around in a forward movement to effect line-spacing of said platen, said driving member and pinion being normally disengaged and separated, automatically-actuated means, whereby said driving member and pinion are kept separated at the end of their reverse movements, to permit rotation of the platen at any time independently of said driving member, said last-mentioned means including a composite second planetary pinion in mesh with said gear or its equivalent, said composite pinion consisting of two adjacent pinions and a spring whereby said two adjacent pinions are rotated relatively to one another to take up the backlash between said composite pinion and said gear or its equivalent, and adjustable means for minutely varying the extent of the effective stroke of said driving member.

25. In a typewriting machine having a revoluble platen, line-spacing means including a line-space lever, a gear connected by movement-reducing mechanism with said platen, a rotary pinion in mesh with said gear having a V-toothed section rotatable therewith, means controlled through movement-multiplying mechanism by said lever and cooperative with said V-toothed section whereby said pinion may be locked to rotate the gear and effect a line-spacing rotation of said platen, and means for minutely varying the extent of the effective stroke of said line-space lever.

26. In a typewriting machine having a revoluble platen, line-spacing means including a line-space lever, an internal gear connected by movement-reducing mechanism with said platen, a planetary pinion in mesh within said gear and having separate pinion-detenting teeth rotatable therewith, means controlled through movement-multiplying mechanism by said lever and operative to engage said detenting teeth to lock the pinion and drive the gear to effect a line-spacing rotation of said gear and platen, and means for minutely varying the extent of the effective stroke of said line-space lever.

27. In a typewriting machine having a revoluble platen, line-spacing means including a line-space lever, a gear always in train through movement-reducing means with said platen, a rotary pinion always in mesh with said gear, said pinion having a supplemental toothed section, normally disconnected means controlled through movement-multiplying mechanism by the movement of said lever and operative to interlock with the supplemental toothed section, whereby said pinion becomes operative in its advance stroke to drive said gear and effect a line-spacing rotation of said platen, and in its return stroke to become disconnected from the platen, to permit independent rotation of the latter, and adjustable means for minutely varying the extent of stroke of said pinion.

28. In a typewriting machine having a revoluble platen, line-spacing means including a line-space lever, an internal gear in train through movement-reducing means with said platen, a rotatable planetary pinion in mesh within said gear, said pinion having a V-toothed section supplementary to its gear-toothed section, a normally disengaged V-toothed dog movable through movement-multiplying mechanism by said lever in line-spacing operation to interlock with said V-toothed section of the pinion, whereby said pinion becomes relatively fixed and operative to drive the gear and effect a line-spacing rotation of said gear and platen, and adjustable means for minutely varying the extent of stroke of said pinion.

29. In a typewriting machine having a rotatable platen, line-spacing means including a line-space lever, an internal gear connected by movement-reducing mechanism with said platen, a rotary planetary pinion in mesh within said gear, said pinion having a toothed pinion-detenting section supplementary to its gear-toothed section, the teeth of said pinion-detenting section having a V-shape substantially finer than the pitch of the gear-teeth, normally disengaged V-toothed means movable through movement-multiplying mechanism by said lever to interlock with said pinion-detenting toothed section, whereby said pinion may be locked and become a driving element for the gear to effect a line-spacing rotation of said gear and platen, and means for minutely varying the extent of the effective stroke of said line-space lever.

30. In a typewriting machine having a revoluble platen, line-spacing means including a line-space lever, a gear connected by movement-reducing mechanism with said platen, a rotatable planetary pinion in mesh within said gear and having a pinion-detenting section, and means including a normally-disconnected driving member floatingly mounted and interlockable with said pinion-detenting section to rotate said pinion and gear about the same axis to effect a line-spacing rotation of said gear and platen, and adjustable means for minutely varying the extent of the effective stroke of said driving member.

31. In a typewriting machine having a revoluble platen, line-spacing means including a line-space lever, an internal gear connected by movement-reducing mechanism with said platen, a rotatable planetary pinion in mesh with said gear, a toothed detenting section integral with said pinion, and means including a driving member formed wth teeth interlockable with the detenting teeth for rotating said pinion and gear to effect a line-spacing rotation of said platen, said interlockable detenting teeth being so formed to permit disengagement without sticking, to permit rotation of the platen at any time independently of said driving member, and adjustable means for minutely varying the extent of the effective stroke of said driving member.

32. In a typewriting machine having a revoluble platen, line-spacing means including a line-space lever, a gear connected by movement-reducing mechanism with said platen, a pinion having teeth always in mesh with said gear and other teeth never in mesh with said gear, and platen-rotating means including a normally-disconnected driving member having teeth capable of interlocking with said last-named pinion-teeth and having a substantially large pressure angle, with non-wedging contour, to permit the interlockable teeth to be disengaged without sticking, to permit rotation of the platen at any time independently of said driving member, and adjustable means for minutely varying the extent of the effective stroke of said driving member.

33. In a typewriting machine having a revoluble platen and a platen-frame, line-spacing means including a line-space lever, a gear always in train through movement-reducing means with said platen, a planetary pinion always in mesh with said gear, said gear and said pinion being mounted in a frame attached to said platen-frame, normally-disconnected means controlled through movement-multiplying mechanism by said lever, whereby said pinion may be gripped and moved around to effect a line-spacing rotation of said gear and platen, a stop mounted on said gear and pinion frame, means rotatable by the line-space lever and co-operative with said stop to limit the planetary movement of said pinion and thereby prevent the overthrow of said platen at the conclusion of the line-spacing stroke, and means for minutely varying the extent of the effective stroke of said line-space lever.

34. In a typewriting machine having a revoluble platen, line-spacing means including a line-space lever, a gear always in train through movement-reducing means with said platen, a planetary pinion always in mesh with said gear, normally-disconnected means controlled by said lever through movement-multiplying mechanism, whereby said pinion is caused to rotate about the axis of the gear to effect a line-spacing rotation of said gear and said platen, a stop co-operative with the gear and pinion rotating means to limit the planetary movement for said pinion and gear to prevent overthrow of said platen at the conclusion of the line-spacing stroke, and means for minutely varying the extent of the effective stroke of said line-space lever.

35. In a typewriting machine having a revoluble platen, line-spacing means including a line-space lever, a gear in train through movement-reducing means with said platen, a planetary pinion in mesh with said gear, a driving member controlled by said lever, whereby said pinion may be gripped and moved around the axis of the gear to effect a line-space rotation of said gear and platen, said pinion and member being normally disengaged to permit independent rotation of the platen, interlocking means including a movable interponent normally in position to hold said pinion and member separated, and controlled by the movement of said lever, whereby said interponent is automatically forced to become effective as an interlock, and adjustable means for minutely varying the extent of the effective stroke of said line-space lever.

BURNHAM C. STICKNEY.